(12) United States Patent
Breslav

(10) Patent No.: US 10,878,185 B2
(45) Date of Patent: Dec. 29, 2020

(54) ANNOTATION-BASED DEPENDENCY CALCULATIONS

(71) Applicant: HRB Innovations, Inc., Las Vegas, NV (US)

(72) Inventor: Roman Breslav, Newton, MA (US)

(73) Assignee: HRB Innovations, Inc., Las Vegas, NV (US)

( * ) Notice: Subject to any disclaimer, the term of this patent is extended or adjusted under 35 U.S.C. 154(b) by 46 days.

(21) Appl. No.: 16/132,927

(22) Filed: Sep. 17, 2018

(65) Prior Publication Data

US 2019/0018831 A1    Jan. 17, 2019

Related U.S. Application Data

(63) Continuation of application No. 14/920,364, filed on Oct. 22, 2015, now Pat. No. 10,078,628.

(51) Int. Cl.

| | |
|---|---|
| *G06F 17/20* | (2006.01) |
| *G06F 40/174* | (2020.01) |
| *G06F 8/30* | (2018.01) |
| *G06F 8/41* | (2018.01) |
| *G06F 8/38* | (2018.01) |

(52) U.S. Cl.
CPC .............. *G06F 40/174* (2020.01); *G06F 8/30* (2013.01); *G06F 8/315* (2013.01); *G06F 8/41* (2013.01); *G06F 8/38* (2013.01)

(58) Field of Classification Search
CPC .......... G06F 40/174; G06F 8/30; G06F 8/315; G06F 8/41; G06F 8/38
See application file for complete search history.

(56) References Cited

U.S. PATENT DOCUMENTS

| | | | | |
|---|---|---|---|---|
| 2003/0188260 | A1* | 10/2003 | Jensen | ................... G06F 40/174 |
| | | | | 715/222 |
| 2004/0237030 | A1* | 11/2004 | Malkin | ................. G06F 17/243 |
| | | | | 715/222 |
| 2007/0006139 | A1* | 1/2007 | Rubin | ....................... G06F 8/30 |
| | | | | 717/106 |

* cited by examiner

*Primary Examiner* — Keith D Bloomquist
(74) *Attorney, Agent, or Firm* — Erise IP, P.A.

(57) ABSTRACT

Media, method and system for creating software capable of performing the steps necessary to prepare a complex form, and more particularly to the use of annotations to specify dependency information for the fields of the form. Embodiments of the invention break down the logic of complex forms into the much simpler logic of individual form fields, greatly simplifying the implementation of the overall logic by allowing individual fields to be worked on independently, with clear delineation of structure and function between them. Embodiments of the invention further allow a user to specify the immediate precursors for a field, and then automatically determine a global calculation order for all fields that ensures that all of the precursor fields for each field being calculated have been previously calculated before that field is calculated.

20 Claims, 4 Drawing Sheets

ANNOTATION-BASED DEPENDENCY CALCULATIONS

RELATED APPLICATION

This patent application is a continuation application claiming priority benefit, with regard to all common subject matter, of earlier-filed U.S. patent application Ser. No. 14/920,364 filed Oct. 22, 2015, and entitled "ANNOTATION-BASED DEPENDENCY CALCULATIONS," and which issued as U.S. Pat. No. 10,078,628 on Sep. 18, 2018 ("the '628 patent") The identified earlier-filed patent is hereby incorporated by reference in its entirety into the present application.

BACKGROUND

1. Field

Embodiments of the invention are broadly directed to improved methods and systems for creating software capable of performing the steps necessary to prepare a complex form, and more particularly to the use of annotations to specify dependency information for the fields of the form.

2. Related Art

Traditionally, implementing the logic of a complex form in software has been done using the same methodology as a human completing the form would: starting at the at the beginning of the form and proceeding through the various fields in order, implementing the logic for calculating each field in turn. This approach is both inherently slow and inherently error prone. It is slow because only a single person can be working on a monolithic implementation at any given time, and it is error-prone because, as form size and complexity increase, the likelihood of errors resulting from obscure interactions between distant portions of the monolithic codebase increases, and full-coverage testing becomes prohibitively difficult. Accordingly, there is a need for improved development methodologies to allow modularization and parallelization of software development for such software.

SUMMARY

Embodiments of the invention address this need by breaking down the logic of the complex form into the much simpler logic of individual form fields. This greatly simplifies the implementation of the overall logic, by allowing individual fields to be worked on independently, with clear delineation of structure and function between them. Embodiments of the invention further address this need by allowing a user to specify the immediate precursors for a field, and then automatically determining a global calculation order for all fields that ensures that all of the precursor fields for each field being calculated have been previously calculated before that field is calculated.

In a first embodiment, the invention includes one or more computer-readable media storing computer-executable instructions that, when executed by a processor, perform a method of automating the implementation of complex form logic, the method comprising the steps of identifying a calculated field of a plurality of fields of a complex form, determining, for the calculated field, one or more precursor fields on which the calculated field depends, creating, by a code generation engine and for the calculated field, a shell class suitable for implementing logic associated with the calculated field based on the values of the one or more precursor fields, creating, by the code generation engine, an annotation for the shell class including indicia of classes corresponding to the one or more precursor fields, and generating, by a compiler and based on the annotation, computer code implementing the logic associated with the field.

In a second embodiment, the invention includes a method of allowing a non-programmer to implement complex form logic, comprising the steps of receiving, from a user, an indication of a calculated field of a complex form, receiving, from the user, indications of a plurality of precursor fields for the calculated field, receiving an indication of a relationship between values of the plurality of precursor fields and a value to be calculated for the calculated field, generating, for the calculated field, a shell class suitable for implementing logic to calculate the value for the calculated field, and creating an annotation for the shell class including indicia of classes corresponding to the plurality of precursor fields and the relationship between the values of the plurality of precursor fields and the value to be calculated for the calculated field, wherein the annotation is usable by a compiler to generate computer code implementing the logic to calculate the value for the calculated field.

In a third embodiment, the invention includes a system for implementing complex form logic, comprising a user interface engine operable to present a user with a representation of a complex form, receive, from the user, an indication of a calculated field of the complex form, receive, from the user, an indication of a precursor field for the calculated field, and receive, from the user, an indication of how the precursor field is used to calculate a value for the calculated field. The system further includes a code generation engine operable to generate a shell class suitable for implementing logic for the calculated field, and generate an annotation for the shell class including indicia of a class corresponding to the precursor field and how the precursor field is used to calculate the value for the calculated field. The system also includes a compiler operable to generate computer code implementing the logic to calculate the value for the calculated field, and generate computer-executable code for implementing the complex form logic based at least in part on the computer code implementing the logic for the calculated field.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
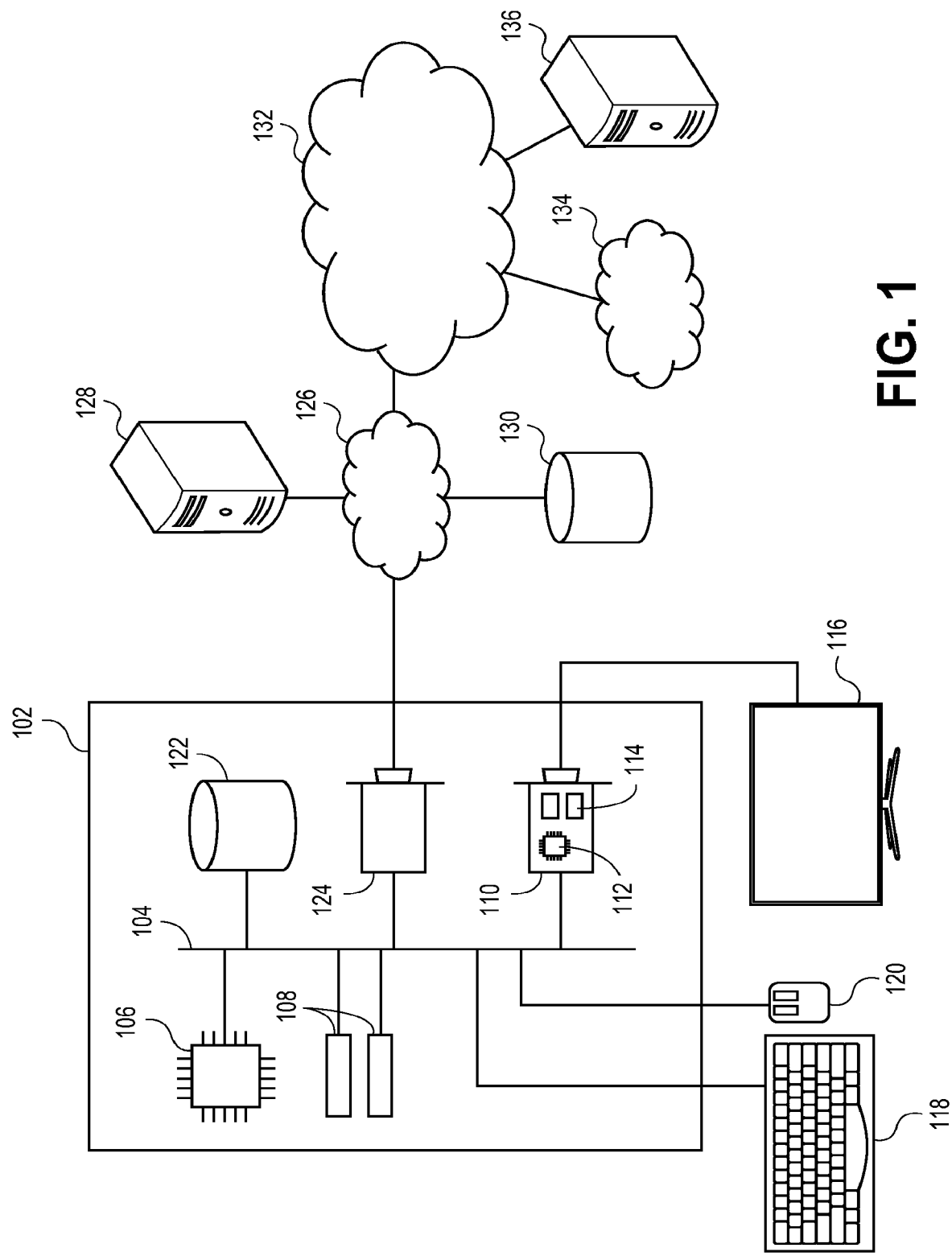
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention are directed to improved methods and systems for creating software capable of performing the steps necessary to prepare a complex form (i.e., to implement the logic corresponding to the instructions for completing the form). An exemplary complex form is a tax return, which has many fields requiring information or calculations. Frequently, fields requiring calculations are dependent on information or calculations in other fields within the form, and these other fields may be dependent on yet other fields. Thus, determining the value for a particular calculated field (i.e., a field that requires calculations to be performed) often requires receiving information or values from other fields in the form.

Because of the complexity of the form itself, software that assists a user in preparing a tax return is also often complex. As can be appreciated, preparation of the tax return by the software requires a particular logic to be executed by the software. For example and with respect to a given field, the software must implement a particular logic to obtain the desired information or value for such field. Any programmers writing the source code that implements the logic of the form must be able to appreciate the intricacies of the form, including the relationships between each field, e.g., the calculation for Field A is dependent on the calculation for Field B.

Traditionally, implementing the logic of the form in software has been done using the same methodology as a human completing the form would: starting at the beginning of the form and proceeding through the various fields in order, implementing the logic for calculating each field in turn. This approach has several disadvantages. First, it is inherently slow. Because implementing the logic for a form requires both programming expertise and subject-matter expertise, and because only a single person can be working on a monolithic implementation (i.e., the source code for the software that prepares the complex form) at any given time, writing or editing of the code will frequently stall while programmers wait for feedback from subject-matter experts and subject-matter experts wait for programming assistance from programmers. Second, it is inherently error-prone. As form size and complexity increase, the likelihood of errors resulting from obscure interactions between distant portions of the monolithic codebase increases, and full-coverage testing becomes prohibitively difficult.

As an example, consider the case of software implementing the logic of the form or forms making up a tax return: programmers working on the user interface and data import components may not have the knowledge of tax law needed to know how to fill in a given field, while tax analysts who know how to fill in the field may not know how to obtain the data needed to do so. As such, because fields depend on each other, development may frequently stall as each calls on the other to perform the next step. Additionally, fields, once filled in, may be subsequently used in widely separated locations within the source code. If a programmer is unaware of one of these locations and changes the representation of the field in the other locations (for example, by changing an addition of a negative field value to a subtraction of a positive value), errors may be introduced.

Embodiments of the invention first address these issues by breaking down the logic of the complex form into the much simpler logic of individual form fields. This greatly simplifies the implementation of the overall logic, by allowing individual fields to be worked on independently, with clear delineation of structure and function between them. In the example above, each field is the definitive representation of a particular blank on a tax form and for how the value for that blank is represented and calculated. It also allows fields requiring more subject-matter expertise (e.g., knowledge of tax law) to be implemented by subject-matter experts (e.g., tax analysts) and fields requiring more programming expertise to be implemented by programmers. Additionally, because the fields are clearly delimited, fields can be implemented simultaneously without interfering with each other. By analogy, the implementation of a complex form is like building a complex watch: the invention moves from a master watchmaker requiring great skill to an assembly line where each worker performs a single, fairly simple task.

However, such modularization introduces its own complexity: that of interrelating the individual fields. The value for each form field may be calculated based on many other field values (both directly and indirectly), and in turn be used in the calculation of many other form fields (again, directly or indirectly). If fields are calculated out of order, or based on the incorrect fields, then the resulting values may be incorrect, even if the logic used to calculate them is correct. While it may be, in some circumstances, a simple matter to determine the secondary fields directly used in the calculation of a given, primary field, determining all of the tertiary fields used in the calculation of the secondary fields, and the quaternary fields used in the calculation the tertiary fields, and so on, quickly becomes unmanageable.

Embodiments of the invention further address these problems by allowing a user to specify the immediate precursors for a field (i.e., those fields directly used in calculating that field), and then automatically determining a global calculation order for all fields that ensures that all of the precursor fields for each field being calculated have been previously calculated before that field is calculated. Furthermore, this process can be performed independently of and prior to the implementation of individual fields, and used to generate templates for the implementation of each necessary field. For example, if a given field is calculated by summing two other fields (which may in turn be the result of complex calculations), the user can select the given field and then click the two precursor fields. This generates a shell into which the implementation logic is inserted and from which the final values of the precursor fields are available.

The example above in turn leads to another insight that can be used to further simplify the implementation process: many individual fields are themselves fairly simple combinations of their precursors. In the above example, the whole of the implementation logic is "add the values of these two precursor fields." Many fields follow one of a small number of similarly simple patterns. By indicating the pattern when indicating the precursor fields, the implementation of that field can be wholly automated. Returning again to the example above, the user can select the field to be calculated, indicate the precursor fields, and specify the relationship between the field and its precursor fields. The entire logic for the field can then be automatically generated without further human intervention, freeing up programmers and subject-matter experts to work on implementing more complicated fields.

Embodiments of the invention are particularly suited to any complex form having many fields, and with at least a plurality of the fields requiring a calculation. The description of the embodiments of the invention provided herein is with respect to a tax return. However, such exemplary complex form should not be limiting, and embodiments of the invention may be used with other types of complex forms requiring other subject-matter expertise.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Turning first to FIG. 1, an exemplary hardware platform that for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and non-removable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Operation of Embodiments of the Invention

Figure 2:
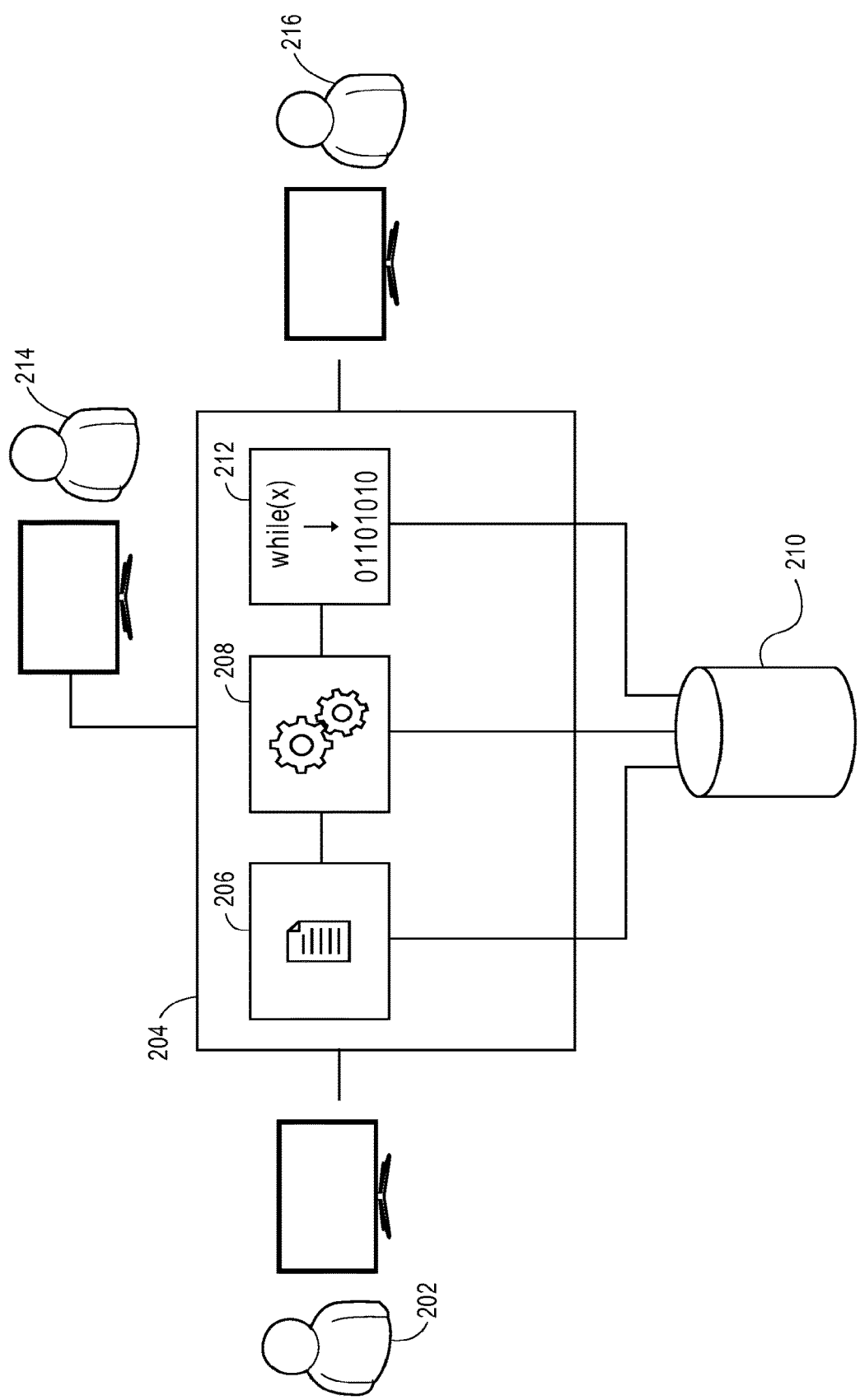
FIG. 2 depicts a system for implementing the logic of complex forms in accordance with certain embodiments of the invention.

Turning now to FIG. 2, a system for implementing the logic of complex forms in accordance with certain embodiments of the invention is depicted. Broadly speaking, a complex form comprises a set of fields and instructions for filling them out in order to calculate a desired value. As described above, a tax return is one example of a complex form. Data entry operator 202 interacts with system 204 to input information about the fields making up the forms or forms. It is an advantage of the present invention that data entry operator 202 need not be familiar with programming or tax law (or the particular expertise associated with the complex form). Broadly speaking, fields in a form can be input fields or calculated fields. Input fields are those fields whose values come from outside the form. A user may provide the value to an input field when completing the form, the value may be imported from a third-party data source, or the value may come from some other source. For example, in the tax-return embodiment, the values for some input fields might be provided by the taxpayer in a tax interview, the values for other input fields could be automatically determined from a user profile, and the values for still other input fields can be imported from a payroll provider.

By contrast, calculated fields are those fields whose values are derived from (i.e., calculated based on) other fields in the form. In some cases, implicit fields may be required to implement the logic of a form. For example, if the instructions for a field of a tax form are to input the sum of the gross wages from all wage statements, this requires that implicit input fields be created for each wage statement so that they can be used in the calculating the field. Where the value of a field depends on the values of fields in an arbitrary number of subforms (for example, the total wages field may depend on the sum of the "gross wages" field of any number of wage statements), multi-occurrence fields and multi-occurrence subforms, as described in greater detail below, can be used.

In some embodiments, fields may be carried from other forms or subforms. For example, if a taxpayer itemized their deductions, the calculation of the total deductible amount could be performed on a separate subform. As discussed above, the total deductible amount would be a calculated field on the form where it is calculated. In some embodiments, the total deductible amount on the form where it is used is an input field sourced from the separate form. In other embodiments, the total deductible amount is a carried field, i.e., a special type of calculated field with a single precursor from the same form or from a different form. In still other embodiments, the entire set of forms is implemented together, and the total deductible amount (as calculated) is the same field as the total deductible amount (as used).

As mentioned above, where multiple occurrences of a field on a form and/or multiple instances of a subform contribute are precursors for a field, multi-occurrence and/or multi-instance forms may be used. As used herein, "multi-occurrence" refers to a field that has multiple occurrences of the same precursor field, and "multi-instance" refers to a field that has, as precursors, multiple instances of the same subform. In either case, the number of precursor fields or precursor subforms may be variable and not known in advance.

As a broad categorization, fields may be single-occurrence/single-instance, multi-occurrence/single-instance, single-occurrence/multi-instance, or multi-occurrence/multi-instance. For example, a field describing alimony payments to a taxpayer might be a single-occurrence/single instance field, since a taxpayer is likely to have no more than a single source of alimony payments in a fixed amount. A field describing total gross wages might be a single-occurrence/multi-instance field, since it depends on a particular field of (potentially multiple) wage statements. A field describing medical expenses for a spouse might be a multi-occurrence/single-instance, since it depends on multiple entries (i.e., individual expenses or categories of expense) from a single subform pertaining to the taxpayer's spouse. As a final example, a field describing medical expenses for each of the taxpayer's dependents might be a multi-occurrence/multi-instance field, since it depends on multiple entries (as in the single-instance case) from each of multiple subforms (one for each of the taxpayer's dependents).

In some embodiments, user interface engine 206 presents a graphical representation of the forms being implemented to data entry operator 202 to indicate the fields and the relevant information about them. Such representations may be stored in data store 210. For example, the form may be displayed on the screen in graphical form, and data entry operator 202 can indicate a field by clicking on it with a mouse, and then click on any other fields that are directly used in the calculation of the indicated field. Such fields are called precursor fields, and are discussed in greater detail below. Alternatively, data entry operator 202 may have a physical copy of the form together with instructions for completing it. Data entry operator 202 can then input each individual field and any necessary information about it. In still other embodiments, the information about each field can be determined based on the instructions for the form with reference to the form itself. The information describing the form fields can be stored (together with the form or separately) in data store 210 or passed directly to code generation engine 208 for further processing.

As mentioned above, data entry operator 202 further specifies the precursors for each calculated field. A precursor field is a field directly used in calculating a calculated field. The set of precursors for a field, the precursor fields for the precursor fields, and so on, are referred to herein as the ancestors of that field. For example, if calculated field A is the sum of input field B and calculated field C, and calculated field C is the difference between input field D and input field E, then the precursors of field A are B and C, while the precursors of field C are D and E. The ancestors of A are B, C, D and E, while the ancestors of C are D and E. An input field will have no precursors and therefore no ancestors. Any given field may be a precursor field for zero, one, or more than one calculated fields.

In some embodiments, data operator 202 may still further specify a relationship between the precursors and the calculated field from a set of predefined relationships. As described above, in many instances, the logic of individual fields is fairly simple: add the precursor fields, or subtract the first precursor field from the second, or calculate the larger of zero and the difference between the first precursor field and the second, and so on. In many areas, a relatively small set of simple patterns will be common. If data entry recognizes such a relationship for a field, the later effort of implementing the logic for that field can be saved. One of skill in the art will immediately recognize that further relationships such as these are common in any given area (e.g., the larger or smaller of the two fields, or the larger of the precursor field and a specified constant) and be able to specify these relationships for use by data entry operator 202.

In some embodiments, the data entry operator may specify names for the fields as they are identified, for ease in recognition and use when specifying them as precursors for other fields. For example, Box A on a United States 1099 form may be designated US-1099-A. Other naming conventions are also possible. In some embodiments, these names are instead automatically assigned based on their identifiers in the form. Such identifiers can be determined, for example, based on the text of metadata of the form. Field identifiers may further be used by code generation engine 208 when generating shell classes and annotations. In other embodiments, arbitrary generated symbols (or gensyms) are used to ensure that each field has a unique identifier. In such embodiments, information about the form fields represented by the symbol may also be stored with the other field information for use when implementing the logic of a field.

As described above, data entry operator 202 is responsible for entering the information about the form that is subsequently used by code generation engine. In some embodiments, the role of data entry operator 202 and user interface engine 206 may instead be performed by an automated form processor. For example, if the form is embodied as a fillable document, it may include metadata indicating the fields, their names (or other identifiers), and even interrelations among fields (e.g., the precursor fields for a calculated field and their relationship with the calculated field). In other embodiments, embedded text from the form or text, recognized using optical character recognition (OCR) on the form, is used to determine the fields and information about them. For example, a field that is to be filled in may be inferred from an empty box or a blank line. An identifier may be recognized form text next to the blank field, and nearby text on the same line (for example, "Enter the sum of boxes A and B here:") can provide precursor and relationship information. In some such embodiments, information is automatically parsed and presented to data entry operator 202 for verification. Other hybrid methods are also possible. For example, where the form is an image with no associated structure, blanks corresponding to fields can be recognized and made into click targets for data entry operator 202 to specify when providing information about the field.

Once the information about fields and precursors has been determined, it is passed to code generation engine 208. Code generation engine 208 generates shell classes corresponding to the identified fields. Broadly, a shell class includes the declaration for a class, which can later be populated by a programmer or subject-matter expert with code implementing the logic of the associated field. The shell may further include stubs for class methods and/or members. It will be appreciated by one of skill in the art that while the terminology used herein is that of object-oriented programming, similar techniques can be employed regardless of the programming paradigm employed. The invention contemplates the use of any such paradigm. Once populated, the class for the field encapsulates all of the functionality of the field including its dependencies and the source code implementing the logic needed to calculate the value of the field.

Code generation engine 206 shifts much of the burden of specifying this information off of programmers and subject-matter experts. Typically, code generation is performed by filling in templates with the appropriate values to produce source code that in turn can be passed to a compiler, which translates human-readable source code into computer-executable code. For example, code generation engine 208 might create a declaration for the class including the identifier for the field and inheritance information for the class (indicating, for example, whether the class corresponds to an input field, a calculated field, a carried field, or a more specialized version of one of these types). In some embodiments, stubs for constructor methods used to instantiate the class when it is needed are also created. In some embodiments, the shell classes include a stub method (i.e., a template for a method without implementation code, which can be later filled in by a programmer) for calculating the value of the field, to be filled in later by a programmer or subject-matter expert. Such stub methods can be prepopulated with an argument list including instances of those classes corresponding to the precursor fields of the field represented by the class being evaluated. Other stub and non-stub methods (e.g., a data import function for import classes) and class members (e.g., a member to memorize the calculated value of the field so that it need not be re-calculated if the value is used again after it has been calculated once) may also be included in these stub classes.

In some embodiments, complete (i.e., non-shell) classes may be generated by code generation engine 206 for simple fields. For example, it may be the case for certain forms or sets of forms that the code for every carried field is substantially identical, differing only in the source of the carried data. Where that source has been specified by data entry operator 202, the code for the class can be generated in its entirety without requiring input from a programmer or subject-matter expert. Similarly, if a relationship between the precursor fields and the field for which the shell class is being generated has been specified by data entry operator 202, all of the information needed to implement the logic of the field is known and so a complete class may be able to be generated in that case as well.

In some embodiments, shell classes including stub methods and members are generated directly by code generation engine 208 based on the data provided by data entry operator 202. In other cases, code generation engine 208 may instead generate annotations for the shell classes, which will cause a preprocessor of compiler 212 to generate the appropriate source code prior to compilation. In still other embodiments, executable code is generated directly from the annotations with no intermediate source code. Annotations (sometimes called decorations) are supplementary information provided with source code that guides the execution of the compiler and/or provides supplementary information about the source code. For example, annotations can be provided with source code to automatically generate appropriate documentation, or (as here) to replace repetitious source code with a template to be expanded by the compiler.

For those classes representing more complex fields, the shell classes will need to be populated with code implementing the logic for the appropriate field. A field may be complex due to requiring complex programming, due to requiring subject-matter expertise, or both. For example, an input field representing a taxpayer's gross wages as reported on a W-2 form is uncomplicated with respect to tax law, but may involve interacting with the taxpayer directly and/or any of a number of payroll providers representing the taxpayer's employer. As such, the necessary interactions may involve a significant amount of programming expertise. By contrast, fields representing more complex tax subjects (e.g., asset depreciation schedules) may involve complex tax law but be fairly simple to program. It is an advantage of the invention that the various fields of the complex form can be divided up between programmers such as programmer 214 and subject-matter experts such as subject matter expert 216 for implementation without mutual interference. Furthermore, if a programmer or subject-matter expert comes across a field that is beyond their level of expertise, they can set it aside for a programmer or subject-matter expert with the appropriate skillset and move on to a different field.

As a field is selected by programmer 214 or subject-matter expert 216 for implementation, a file containing the corresponding class can be retrieved (either directly from code generation engine 208 or from data store 210), programmer 214 or subject-matter expert 216 adds the code to implement the logic, and stores the file back in data store 210. Once all of the fields have been implemented (either automatically or by programmer 214 or subject-matter expert 216), compiler 212 can combine the source code for the classes corresponding to the individual fields into executable code for implementing the logic of the complex form (or set of forms) as a whole. It is a further advantage of the invention that the task of resolving all of the dependencies needed for a particular field can be delegated to compiler 212, thereby removing the possibility for human error from the process. It is a yet further advantage of the invention that, because each field is represented by its own class, unit testing (i.e., exhaustively testing each component unit across the range of all possible inputs) becomes feasible in a way it is not when the smallest possible unit is the entire complex form.

Figures 3, 4:
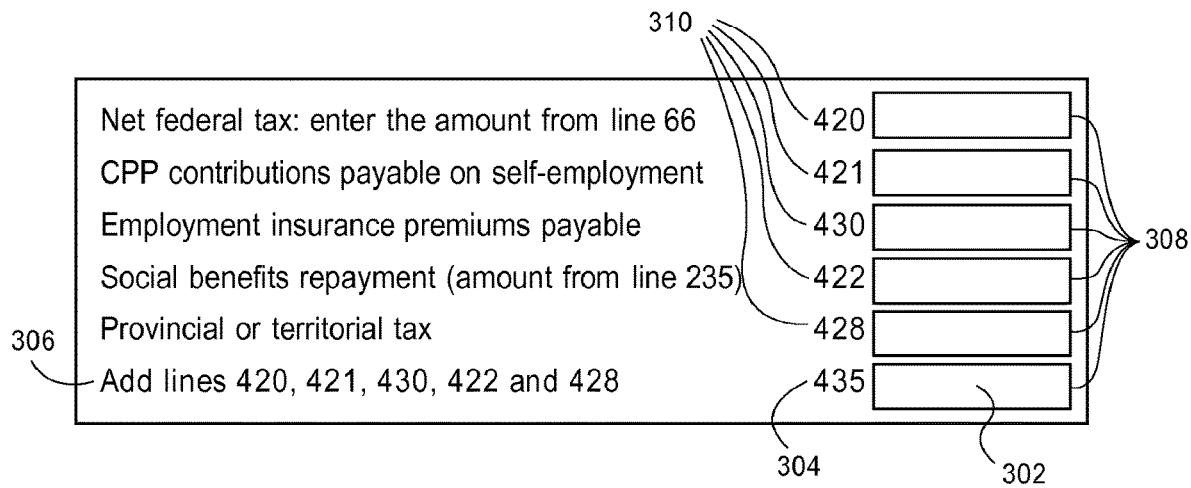
FIG. 3 depicts a small excerpt of a complex form suitable for implementation by embodiments of the invention.
FIG. 4 depicts an exemplary shell class in accordance with embodiments of the invention and corresponding to the form of FIG. 3.

Turning now to FIG. 3, a small excerpt of a complex form suitable for implementation by embodiments of the invention is depicted. In particular, this portion of the Canadian T1 form collects information calculated elsewhere and on various other forms to calculate a total payable amount. In particular, this excerpt determines calculated field 402. Calculated field 402 is given the field identifier "435," which is referred to by reference numeral 304. Instructions 306 for field 302 indicate the precursor fields 308 for calculated field 302. In the form shown, instructions 306 indicate precursor fields 308 by their respective field identifiers 310, and further indicate that calculated field 302 is the sum of precursor fields 308.

Turning now to FIG. 4, an exemplary shell class in accordance with embodiments of the invention and corresponding to the form of FIG. 3 is depicted, and referred to generally by reference numeral 402. As discussed above, shell classes such as shell class 402 represent a field of a complex form. In this case, class 402 corresponds to field 302. Class 402 has been assigned, either automatically or by data entry operator 202, class name "T1_435" (referred to by reference numeral 404) based on field identifier 304 and representing field 435 of form T1. Class 402 is annotated with dependency annotation 406 indicating the precursors for field 302. In this case, field 302 has precursor fields 308; accordingly, annotation 406 indicates that class 402 depends on classes 408, each corresponding to one of fields 308. In this instance, annotation 406 also indicates the relationship between fields 308 and field 302 (and therefore, between the values generated by classes 408 and the value to be generated by class 402). Because of this, class 402 need not be populated by programmer 214 or subject-matter expert 216; rather, the necessary code can be generated by compiler 212. Note also that (as can be seen from FIG. 3), each of fields 308 is a carried field. This need not be reflected in class 402 or annotation 406. When the code for class 402 executes to evaluate field 302, the code corresponding to each of classes 408 can in turn be called to evaluate the corresponding field, regardless of whether it is an input field, a calculated field, or a carried field. Note also that, as mentioned above, class 402 has been annotated with field identifier annotation 410, indicating that class 402 corresponds to field "435." This allows for introspection and simpler debugging. For example, the unit tests briefly described above can easily be specified simply by identifying the field to be tested.

Figure 5:
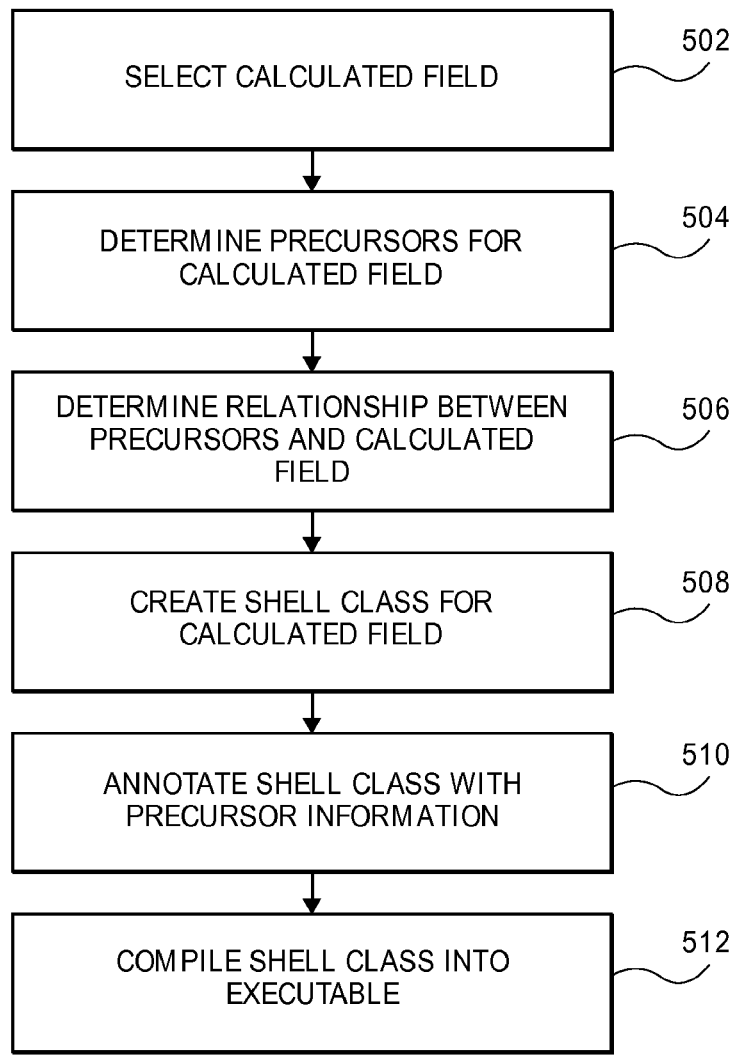
FIG. 5 depicts a flowchart illustrating the operation of a method in accordance with the invention.

Turning now to FIG. 5, a flowchart illustrating the operation of a method in accordance with the invention is depicted, and referred to generally by reference numeral 500. The method begins at a step 502, where a calculated field for which an annotated shell class is to be generated is selected. As described above, a user such as data entry operator 202 may provide an indication of the class. Alternatively, the form may be processed directly, via optical character recognition, text extraction, or the use of metadata contained in the form to determine all of the fields for processing in turn.

Once the calculated field has been selected, processing proceeds to step 504, where the precursor fields for the calculated field are determined. As with the previous step, this is done in some embodiments by a user such as data entry operator 202. For example, the user can click once in the form to select the calculated field, and then click on other fields in turn to indicate that they are precursor fields for the field to be calculated. In other embodiments, the precursor fields for the field are automatically extracted from the textual instructions for completing the form. For example, if the instructions for the calculated field read "Enter the value from line X here," then the field corresponding to line X can be determined to be the sole precursor for the calculated field. In still other embodiments, such as those where the complex form is a fillable form that automatically performs certain calculations, metadata included with the form can be used to determine the precursors. For example, if the metadata indicates that the calculated field is to be automatically filled in with the sum of two other fields when completing the form, then those fields can be determined to be the precursors for that field. Other ways of determining the precursors for fields are also contemplated as being with the scope of the invention.

Once the precursors of the calculated field have been determined, processing can proceed to step 506, where the relationship between the precursor fields and the calculated field is determined. In some embodiments this is performed at the same time the precursor fields are specified, either automatically or by data entry operator 202. As discussed above, the form may contain information that can be automatically extracted to determine this relationship. In other embodiments, however, such as those where the relationship between the precursor fields and the calculated field is more complex, the relationship is instead specified by programmer 214 or subject-matter expert 216 after the shell class has been generated, as discussed below with respect to step 508.

Processing then proceeds to step 508, where a shell class corresponding to the calculated field is generated. Broadly speaking, the shell class includes source code common to most or all classes for calculated fields. In some embodiments, the shell class is named based on an identifier for the calculated field and/or the form on which it appears. In other embodiments, the class name is specified by data entry operator 202. In still other embodiments, the class name is an arbitrary generated symbol. In some embodiments, stub methods and members for the class are also generated to be populated by programmer 214 or subject-matter expert 216. In such embodiments, it may be the case that method stubs are prepopulated with argument lists based on the precursors for the calculated field.

Once the shell class has been created, processing can proceed to step 510, where the created shell class is annotated with the precursor information. As described above with respect to FIGS. 3 and 4, the annotation may include only indications of the precursors for the calculated field, or it may include an indication of the relationship between the precursor fields and the calculated field. In some embodiments, the precursors of a field and the relationship between them and the calculated field are indicated in a single annotation. In other embodiments, precursor fields and their relationship to the calculated field are indicated in separate annotations. In some embodiments, additional annotations are also provided, indicating the form name, field name, or other information about the calculated field.

As discussed above with respect to user interface engine 206 and FIG. 4, any commonly repeated relationship could be annotated for the shell class. For example, the annotations "@Sum," "@DifferenceOrZero," and "@From" (indicating a carried field) may commonly be used to specify field relationships where the tax return being prepared is a tax return. Annotations including "@FieldCode" or "@FieldInstruction" may be employed to tie the shell class back to an individual line of the complex form, and annotations such as "@Provincial" (or "@State," as appropriate) may be employed to indicate that the shell class is relevant to a provincial (or state) tax return. Finally, where multi-occurrence and/or multi-instance fields are used, specialized annotations such as "@AsTotal" (indicating that all of the instances of the precursor field should be summed to obtain the field value for the shell class) and "@MultiOccurring" (indicating that each occurrence of the precursor field in the subform should be passed to its own instantiation of the shell class). Of course, annotations can also be used in combination. For example, a class could include "@FieldCode," "@MultiOccurring," and "@AsTotal" to indicate that the shell class is associated with a particular field of the return, and that all of the instances of each occurrence of the precursor field on the subform should be summed into a corresponding instantiation of the shell class.

Finally, processing proceeds to a step 512 where the source code of the shell class (in combination with any necessary source code implementing the logic of the field added by programmer 214 or subject-matter expert 216) is compiled by compiler 212 into executable code implementing the logic of the form. In some embodiments, many such shell classes are compiled together into a unified executable or set of executables. In some embodiments, as described above, the compiler utilizes a preprocessor to generate appropriate source code from the annotations prior to compilation. In other embodiments, the annotations are translated directly into executable code by compiler 212. When executed by a processor, this executable code implements the logic of the complex for as a whole.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more computer-readable media storing computer-executable instructions that, when executed by a processor, perform a method of automating the implementation of form logic, the method comprising the steps of:
presenting, in a graphical user interface and to a user, a representation of an existing, physical form;
receiving, from the user and via the graphical user interface, a selection of a first area of the representation of the existing, physical form;
identifying, based on the selected first area, a calculated field of a plurality of fields of the form based on optical character recognition of a first text field associated with the first area;
receiving, from the user and via the graphical user interface, a selection of a second area of the representation of the existing, physical form;
automatically determining, based on the selected second area, the first text field, and the calculated field, one or more precursor fields on which the calculated field depends; and
receiving, from the user and via the graphical user interface, a selection of an implementation technique for the calculated field, the implementation technique selected from the set consisting of:
receiving, from the user and via the graphical user interface, an indication of the relationship between the one or more precursor fields and the calculated field;
receiving, from the user and via the graphical user interface, an indication that the calculated field should be written by a programmer in an object-oriented programming language, independently from a subject-matter expert.

2. The media of claim 1, wherein the method further comprises the step of:
if the implementation technique selected by the user indicates that the calculated field should be written by the programmer, generating a shell class suitable for population, by the programmer, with source code implementing the logic the of calculated field.

3. The media of claim 1, wherein the method further comprises the step of:
if the implementation technique selected by the user indicates the relationship between the one or more precursor fields and the calculated field, generating a class including source code implementing the logic the of calculated field.

4. The media of claim 1, wherein the indication of the relationship between the one or more precursor fields and the calculated field comprises an annotation.

5. The media of claim 1, wherein the one or more precursor fields are one or more calculated precursor fields.

6. The media of claim 1, wherein the form is a tax form.

7. The media of claim 1, wherein the one or more precursor fields is a plurality of precursor fields and wherein the relationship is a summation relationship.

8. A method of automating the implementation of form logic comprising the steps of:
presenting, in a graphical user interface and to a user, a representation of an existing, physical form;
receiving, from the user and via the graphical user interface, an indication of a calculated field of a plurality of fields of the form;
automatically determining an indication of a plurality of precursor fields on which the calculated field depends based on optical character recognition of a plurality of text fields associated with the plurality of precursor fields; and receiving, from the user and via the graphical user interface, a selection of an implementation technique for the calculated field, the implementation technique selected from the set consisting of:
    receiving, from the user and via the graphical user interface, an indication of a relationship between the plurality of precursor fields and the calculated field; and
    receiving, from the user and via the graphical user interface, an indication that the calculated field should be written by a programmer in an object-oriented programming language, independently from a subject-matter expert.

9. The method of claim 8, wherein the indication of the calculated field is a selection of a first area of the representation of the existing, physical form.

10. The method of claim 8, wherein the indication of the plurality fields is a selection of a corresponding plurality of second areas of the representation of the existing, physical form.

11. The method of claim 8, wherein the relationship is a difference relationship.

12. The method of claim 8, wherein the indication of the relationship between the plurality of precursor fields and the calculated field comprises an annotation.

13. The method of claim 8, wherein the form is a tax form.

14. The method of claim 8, wherein the method further comprises the step of:
    if the implementation technique selected by the user indicates that the calculated field should be written by the programmer, generating a shell class suitable for population, by the programmer, with source code implementing the logic the of calculated field.

15. The method of claim 8, wherein the method further comprises the step of:
    if the implementation technique selected by the user indicates the relationship between the plurality of precursor fields and the calculated field, generating a class including source code implementing the logic the of calculated field.

16. One or more computer-readable media storing computer-executable instructions that, when executed by a processor, perform a method of automating the implementation of form logic, the method comprising the steps of:
    presenting, in a graphical user interface and to a user, a graphical representation of an existing, physical tax form;
    receiving, from the user and via the graphical user interface, a selection of a first area of the graphical representation of the existing, physical tax form;
    identifying, based on the selected first area and on optical character recognition of a first text field associated with the first area, a calculated field of a plurality of fields of the tax form;
    receiving, from the user and via the graphical user interface, a selection of a second area of the graphical representation of the existing, physical tax form;
    automatically determining, based on the selected second area, first text field, and the calculated field, one or more precursor fields on which the calculated field depends;
    receiving, from the user and via the graphical user interface, a selection of an implementation technique for the calculated field, the implementation technique selected from the set consisting of:
        receiving, from the user and via the graphical user interface, an annotation indicating the relationship between the one or more precursor fields and the calculated field;
        receiving, from the user and via the graphical user interface, an annotation indicating that the calculated field should be written by a programmer in an object-oriented programming language, independently from a subject-matter expert.

17. The media of claim 16, wherein the one or more precursor fields is a single precursor field, and wherein the single precursor field is a carried field.

18. The media of claim 16, wherein the method further comprises the step of:
    if the implementation technique selected by the user indicates that the calculated field should be written by the programmer, generating a shell class suitable for population, by the programmer, with source code implementing the logic the of calculated field.

19. The media of claim 16, wherein the method further comprises the step of:
    if the implementation technique selected by the user indicates the relationship between the one or more precursor fields and the calculated field, generating a class including source code implementing the logic the of calculated field.

20. The media of claim 16, wherein the relationship is a difference-or-zero relationship.

\* \* \* \* \*